Donald C. Forster
INVENTOR.

United States Patent Office 3,534,288
Patented Oct. 13, 1970

3,534,288
STABILIZED LASER SYSTEM
Donald C. Forster, Woodland Hills, Calif., assignor to Hughes Aircraft Company, Culver City, Calif., a corporation of Delaware
Filed Dec. 15, 1967, Ser. No. 691,000
Int. Cl. H01s 3/00
U.S. Cl. 331—94.5                                7 Claims

ABSTRACT OF THE DISCLOSURE

This is a laser system having a stabilized output spectrum that produces an unmodulated output beam. The invention incorporates a tunable laser to be stabilized and a motion sensing laser that is used as a reference. The spaced reflectors making up the resonant cavities of each of these lasers are mounted on opposite wall members of a common mirror support structure. The motion sensing laser is frequency stabilized by stabilization circuitry which also produces an error signal that is coupled to the tunable laser for stabilization purposes. The motion sensing laser is thus used to detect the relative movement of the common mirror support structure. Since the motion amplitude of the tunable laser reflectors is linearly related to the motion amplitude of the motion sensing laser reflectors in the fundamental vibrating mode of the common mirror support structure, the error signal generated thereby may be advantageously coupled to the frequency adjusting means of both laser cavities.

---

The usual way to stabilize a laser oscillator has been to isolate it from thermal and mechanical shocks. Usually, this involves immersing a laser cavity in as nearly a constant temperature bath as possible, such as a controlled temperature and humidity room and mounting the laser cavity on a vibration-free and isolated platform, sometimes located underground. The cavity mirrors have also been mounted internally with respect to the laser in order to remove fluctuations due to perturbations in the cavity, such as scattering from dust particles, etc., that afflict Brewster angle lasers with externally mounted mirrors, for example. Generally, isolation methods have proved to be impractical for most applications.

Feedback systems have also been used in an effort to obtain satisfactory stabilization. In an early attempt to gain the desired goal, a servo system was devised to keep the total output intensity at a maximum. However, this technique proved to be too insensitive to stabilize the oscillator to within better than some tens of megacycles. Later, what has become known as the dither-stabilized laser was developed where an error signal was produced by oscillating one of the reflectors comprising the resonant cavity of the laser at an audio rate and directing a portion of the laser output beam at a photodetector, the output of which was phase detected to provide a DC voltage proportional to the derivative of the curve of output power plotted against frequency. The laser output was then locked to one of three zero slope points resulting from a center tuning dip by properly applying this feedback energy to the oscillating reflector. The drawbck here was that the oscillator beam was frequency modulated. A more detailed description of this technique may be reviewed by referring to an article by W. R. C. Rowley and D. C. Wilson in Nature, London, vol. 200, pp. 745–747, Nov. 23, 1963.

The output spectrum of gaseous lasers in particular is critically dependent on the stability of the resonator mirrors or reflectors. Without some electronic feedback positioning, mirror vibration in normal environments is too severe to allow operations such as AFC locking or Doppler shift measurements over reasonable ranges. Currently, the only gas lasers which can be operated at a single frequency that is "locked" in an electronic servo are very short and thus limited at most to a few hundred microwatts of output power. This is a consequence of a fact that the cavity resonance spacing, which is proportional to numeral $1/\rho$, where $\rho$ is the separation between the mirrors, must be larger than the Doppler broadened line. Certain gas lasers such as the argon laser, for example, are attractive for many applications but cannot at present be operated at a single frequency without employing elaborate techniques since the Doppler broadened linewidth (~5 gc.) is so large that the mirror spacing could be no greater than 1 cm. This is obviously impractical.

In contrast to the prior laser stabilization art as described above, the invention has the advantage of providing a high power laser having a stabilized output spectrum that is free of modulation, even where the laser has a very large Doppler broadened linewidth.

It is therefore an object of the present invention to provide an improved stabilized laser oscillator.

It is another object of the present invention to provide a high power stabilized laser oscillator that produces an output beam free of modulation.

It is still another object of the present invention to provide a high power stabilized laser oscillator usable with laser materials having very large Doppler broadened linewidths.

These and other objects of the invention are obtained, according to one embodiment of the invention, in a stabilized laser system including a gas laser to be stabilized which has a discharge tube disposed between two reflectors and tuning means that is coupled to one of the reflectors for adjusting the frequency of oscillation of the gas laser. Also included is a motion sensing laser that produces a control laser beam and has two spaced reflectors and frequency adjusting means coupled to one of these reflectors for adjusting the frequency of oscillation of the motion sensing laser. A common mirror support structure is provided having two opposite wall members upon each of which opposite reflectors of the gas laser and the motion sensing laser are mounted. Frequency stabilization circuitry is coupled to the motion sensing laser and is responsive to the control laser beam to stabilize the frequency of oscillation of the motion sensing laser and also produces a DC error signal that is coupled to the tuning means of the gas laser to stabilize the output spectrum thereof.

The invention and specific embodiments thereof will be described hereinafter by way of example and with reference to the accompanying drawings wherein like reference numerals refer to like elements or parts and in which.

Figure 1:
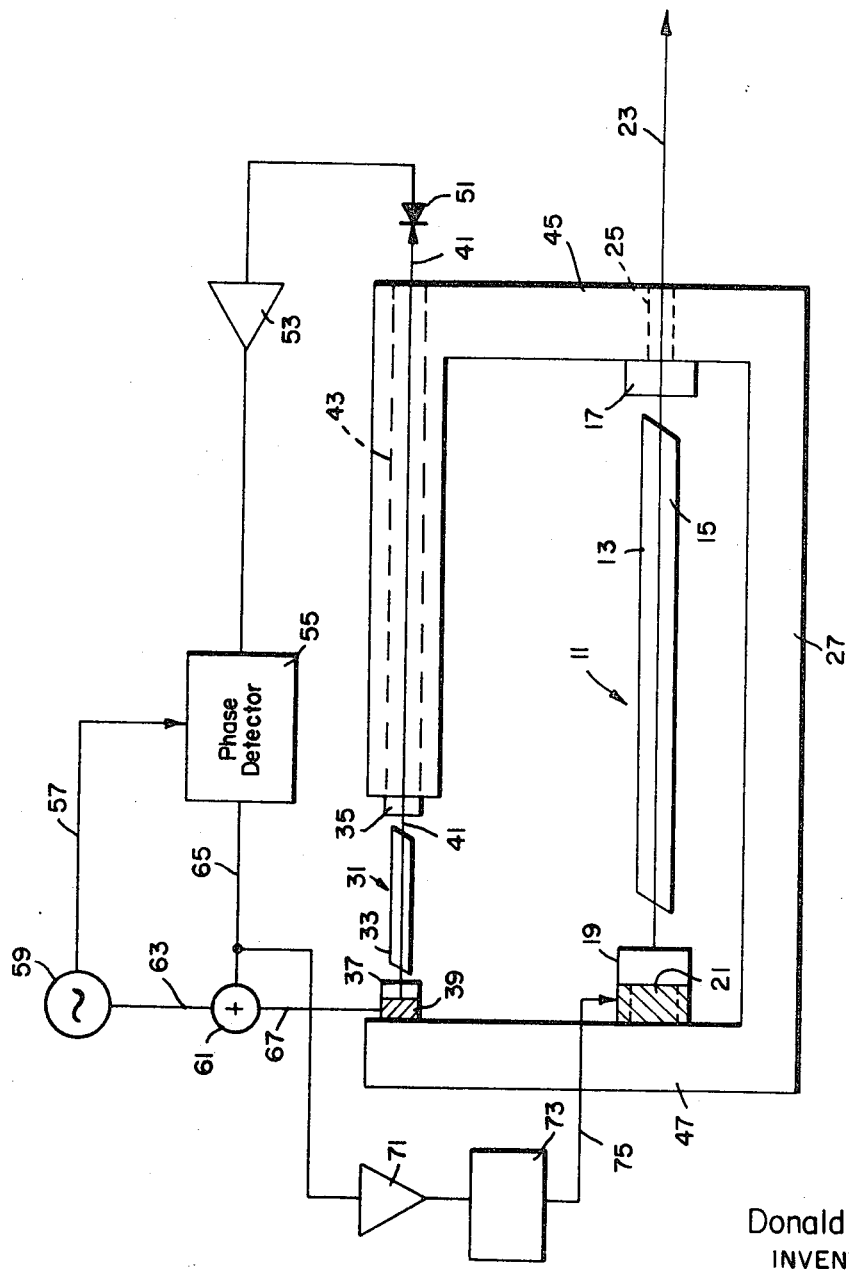
FIG. 1 is a schematic diagram of an embodiment of the invention in which a dither-stabilized laser system is used in conjunction with the motion sensing laser.

With reterence now to the drawings and more particularly to FIG. 1, there is shown a laser system having a stabilized output spectrum comprising a gas laser oscillator 11 including a discharge tube 13 which, for example, may be filled with argon or other laseable material in a gaseous state and further including a partially transmissive mirror or reflector 17 and a substantially reflective mirror or reflector 19 that is mechanically coupled to and mounted on an electromechanical transducer element such as a piezoelectric crystal 21. The laser oscillator need not be a gas laser but may utilize active laser material in any physical state. When properly energized by conventional pumping means, not shown for clarity, the laser 11 produces an output beam designated here as line 23, which beam projects through the mirror 17 and an aperture 25 in a common mirror support structure 27.

Also shown in FIG. 1 is a motion sensing laser 31 including an active laser element 33 disposed between a partially transmissive reflector 35 and a substantially reflective mirror or reflector 37 mounted on an electromechanical transducer element such as a piezoelectric crystal 39. The motion sensing laser 31 should preferably be of the single mode type and may use as its active laser material gases such as helium-neon or xenon, for example. The laser 31 produces a control beam designated here as line 41 which projects from the mirror 35 and through an aperture 43 in the common mirror support structure 27.

The common mirror support structure 27 has two opposite wall members 45 and 47, upon each of which opposite reflectors of the gas laser 11 and the motion sensing laser 31 are mounted. In this type of configuration, the motion amplitude of the gas laser 11 reflectors is linearly related to the motion amplitude of the motion sensing laser reflectors in the fundamental vibrating mode of the structure 27.

The control beam 41 is detected by a photodetector 51, the output of which may be amplified by an amplifier 53 before being coupled to a conventional phase detector 55. The phase detector 55 is coupled by a reference line 57 to an audio frequency oscillator generally known as a dither oscillator 59 which provides a reference signal along the line 57 to the phase detector 55 and which also provides such a signal to an adder 61 by way of line 63. The output from the phase detector 55 is a DC error signal and is coupled by means of line 65 to the adder 61 where it is summed with the signal from the dither oscillator 59. The output of the adder 61 is in the form of the sum of the error signal and the dither oscillator signal and is coupled to the transducer 39 of the motion sensing laser 31 through line 67 in order to control the oscillation frequency of the laser 31. The error signal output from the phase detector 55 may also be coupled through an amplifier 71 before being fed to a conventional adjustable phase factor element 73, the output of which is in turn coupled by means of line 75 to the transducer 21 of the gas laser oscillator 11.

Figure 3:
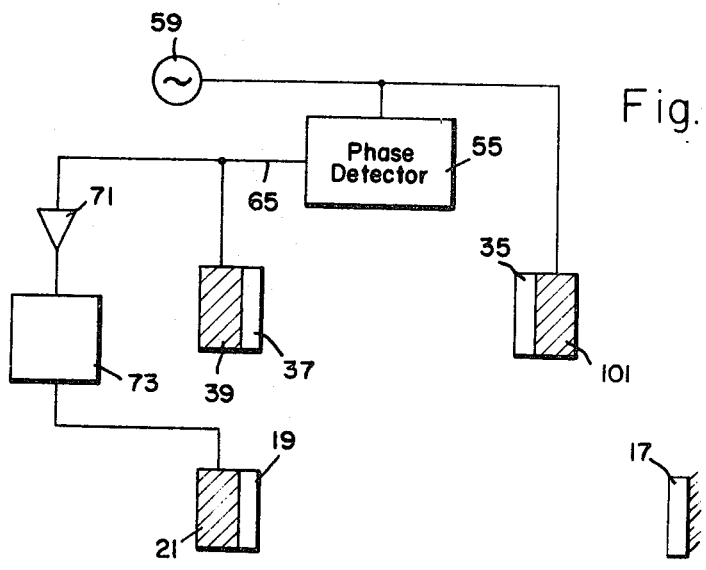
FIG. 3 is a simplified diagram of another embodiment of the invention.

An alternate configuration could employ separate transducers for the application of the DC error signal and the dither signal, thus eliminating the adder. This arrangement is shown in FIG. 3 where a transducer 101 is directly driven by the dither oscillator 59.

Figure 2:
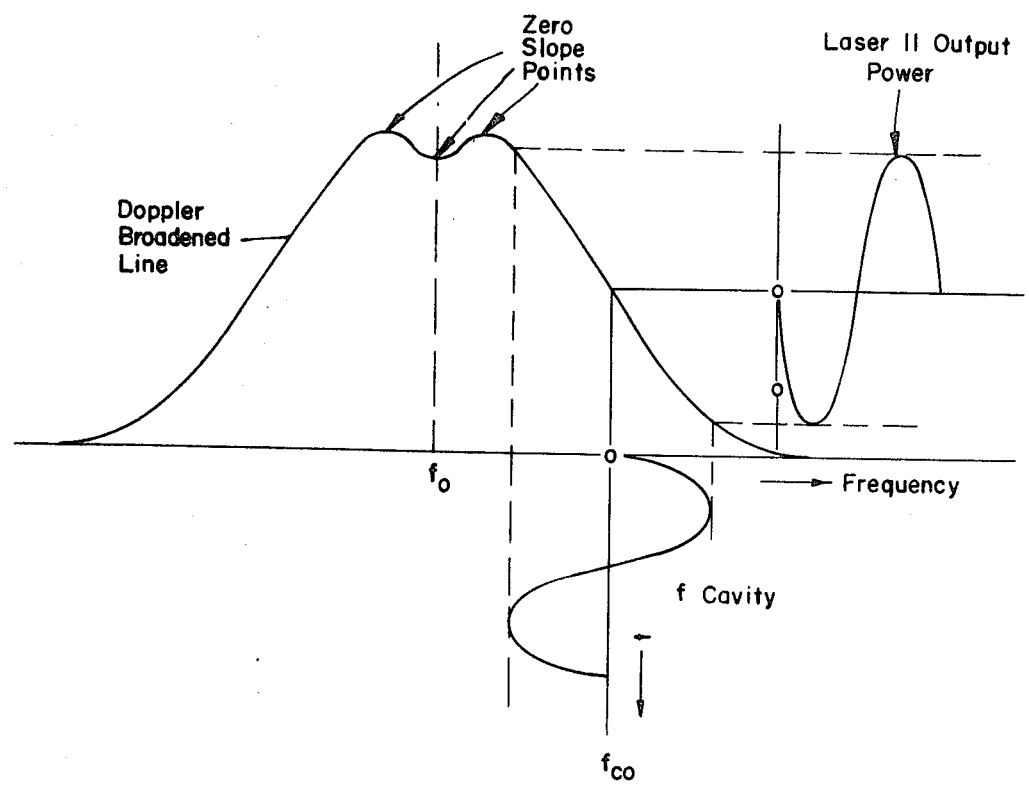
FIG. 2 is a sketch of the transfer characteristics between cavity modulation and output power as used in the dither-stabilized laser system shown in FIG. 1.

In describing the operation of the invention, it would be helpful first to describe the frequency stabilization scheme for the motion sensing laser 31. It should first, however, be clearly understood that although a "dither" stabilization scheme is described in detail, any other type of scheme that provides the desired result may be utilized. In the "dither" method of stabilization as shown here, an error signal is produced by oscillating one of the reflectors, such as reflector 37, comprising the resonant cavity of the laser 31 at an audio rate, for example 350 c.p.s., and directing the output control beam 41 at the photodetector 51. The resulting modulation of the photodetector output is homodyne or phase-sensitive detected by the phase detector 55 to provide a DC voltage proportional to the derivative of the curve of the output power plotted against frequency, as seen in FIG. 2. The oscillation frequency of the laser 31 is then locked to one of three zero slope points resulting from a center tuning dip by properly applying this feedback energy by way of the adder 61 to the transducer 39 and the reflector 37.

In other words, the reflector 37 is caused to move in a sinusoidal fashion at a low frequency rate. This, in effect, moves the cavity resonance frequency within the Doppler broadened linewidth as illustrated in FIG. 2 and, as a consequence, the control beam 41 of the laser 31 is modulated. The phase of the modulation depends upon whether the center cavity frequency $f_{co}$ is above or below one of the three zero slope points as seen in FIG. 2. Error signals may be produced using either amplitude and/or phase comparison techniques that are well known in the art. By combining the error signal from the phase detector 55 and the dither signal from the dither oscillator 59 at the mixer 61, the signal applier to the transducer 39 drives $f_{co}$ toward the selected zero slope point. Gas lasers such as helium-neon can be stabilized to a few megacycles using this technique where single mode operation is assured using very short resonators to make cavity mode separation comparable to linewidth. Therefore, the control beam 41 of the motion sensing laser 31 is a stabilized reference signal having a modulation component superposed thereon.

It can also be seen from FIG. 1 that the output from the phase detector 55 is amplified and passed through a phase factor element 73 before being applied to the electromechanical transducer 21 supporting the reflector 19 of the gas laser 11. The phase factor element 73 may be deleted for many applications and is merely a phase shifting network that takes into account the phase difference of various higher order modes of the laser. It is designed to exhibit the characteristic $H=he^{j\phi}$, where $h$ is the scaler adjustment and $\phi$ is the arbitrary phase factor.

Separate but related error signals are simultaneously supplied to the reflector supporting transducers of the two lasers involved and the dither-stabilized motion sensing laser 31 is utilized to detect relative movement of the common mirror support structure 27. This scheme provides the desired results because of the relationship of the cavity mirrors or reflectors for the two lasers when mounted on a common mirror support structure such as the structure 27. Here, the motion amplitude of the reflectors 35 and 37 of the motion sensing laser 31 is linearly related to the motion amplitude of the reflectors 17 and 19 of the gas laser 11 in the fundamental vibrating mode of the common mirror support structure 27. Thus, it should be clear that a change in the cavity spacing of the laser 31 will be related to a change in the cavity spacing of the laser 11 and a compensation for such a change in the laser 31 in the form of an error signal may also be applied to the oscillation frequency determining portion of the laser 11 to correct for the change in its resonant cavity spacing.

The common mirror support configuration shown in FIG. 1 is only indicative of one embodiment of the invention. Other configurations having similar characteristics may look quite differently. If a higher degree of performance is desired, separate error channels can be provided for each of the vibration modes of the common mirror support structure, with independent scale and phase factors provided in the feedback loop. In practice, these can be left as variables and final adjustment could be made by minimizing the beat spectrum between two lasers of the type shown.

Since there is no provision for absolute mode locking with this method, only temperature compensation can be provided for long term stability. However, sufficient stabilization can be attained in this manner to permit comparison of Doppler returns from targets at long ranges in measurement systems, for example. With careful design of a simple, fundamental vibrating mode support structure, extremely accurate compensation of the vibration of the high power laser reflectors is possible. It is again important to note that only the DC error signal and not the dither signal is coupled to the high power laser resonator and thus the output frequency of the laser is not sinusoidally modulated.

From the foregoing, it should be seen that the invention provides an improved laser having a stabilized output spectrum. It should also be noted that the invention allows the stabilization of a high power laser by the use of a very low power single mode stabilized laser. Furthermore, it is again stressed that stabilization methods other than the dither-stabilized system described herein may be used in conjunction with the motion sensing laser 31. In this regard, any active laser material may be used in the laser 11, but with particular advantage when utilizing an active laser material such as argon which is capable of high power but which has a very large Doppler broadened linewidth. However, this in no way limits this invention to an argon laser or even a gas laser since it is generally applicable to all types of lasers.

It is intended that the foregoing disclosure and drawings shall be considered only as illustrations of the principles of this invention and are not to be construed in a limiting sense.

What is claimed is:

1. A laser having a stabilized output spectrum, comprising:
    a laser to be stabilized producing an output laser beam spectrum and including an active laser material disposed between two reflectors and tuning means coupled to one of said reflectors for adjusting the frequency of oscillation of said laser,
    a motion sensing laser producing a control single mode laser beam and including two spaced reflectors and frequency adjusting means coupled to at least one of said reflectors for adjusting the frequency of oscillation of said motion sensing laser,
    a common regenerative cavity support structure having two opposite wall members upon each of which opposite reflectors of said laser to be stabilized and said motion sensing laser are mounted, and
    control means coupled to said frequency adjusting means of said motion sensing laser and responsive to said control laser beam for stabilizing the frequency of oscillation of said motion sensing laser and for producing a DC error signal coupled to said tuning means of said first mentioned laser.

2. A laser having a stabilized output spectrum, comprising:
    a gas laser to be stabilized producing an output laser beam spectrum and including a discharge tube disposed between two reflectors and tuning means coupled to one of said reflectors for adjusting the frequency of oscillation of said gas laser,
    a motion sensing laser producing a control single mode laser beam and including two spaced reflectors and frequency adjusting means coupled to at least one of said reflectors for adjusting the frequency of oscillation of said motion sensing laser,
    a common regenerative cavity support structure having two opposite wall members upon each of which opposite reflectors of said gas laser and said motion sensing laser are mounted, and
    control means coupled to said frequency adjusting means of said motion sensing laser and responsive to said control laser beam for stabilizing the frequency of oscillation of said motion sensing laser and for producing a DC error signal coupled to said tuning means of said gas laser.

3. A laser according to claim 1, wherein said control means includes a photodetector optically coupled to said control laser beam, a low frequency dither oscillator, a phase detector coupled to and responsive to both the output of said photodetector and that of said dither oscillator to provide a DC error signal to said tuning means of said laser to be stabilized, an algebraic adder coupled to said dither oscillator and to said phase detector and responsive to said error signal to provide a modulated DC error signal to said frequency adjusting means of said motion sensing laser.

4. A laser according to claim 3, wherein a phase factor element is disposed in the circuit between said phase detector and said tuning means to introduce a predetermined phase factor to said DC error signal for mode compensation purposes.

5. A laser according to claim 4, wherein an amplifier is coupled to the output of said detector to amplify the output thereof before it is coupled to said phase detector, and wherein a DC amplifier is disposed in the circuit between said phase detector and said tuning means to amplify said error signal.

6. A laser according to claim 1, wherein said frequency adjusting means of said motion sensing laser includes a first electromechanical transducer upon which a first of said two spaced reflectors is mounted and a second electromechanical transducer upon which the other of said two spaced reflectors is mounted; and wherein said control means includes a photodetector optically coupled to said control laser beam, a low frequency dither oscillator coupled to said first electromechanical transducer, a phase detector coupled to and responsive to both the output of said photodetector and that of said dither oscillator to provide a DC error signal to said tuning means of said laser to be stabilized and to said second electromechanical transducer.

7. A laser according to claim 2, wherein said frequency adjusting means of said motion sensing laser includes a first electromechanical transducer upon which a first of said two spaced reflectors is mounted and a second electromechanical transducer upon which the other of said two spaced reflectors is mounted; and wherein said control means includes a photodetector optically coupled to said control laser beam, a low frequency dither oscillator coupled to said first electromechanical transducer, a phase detector coupled to and responsive to both the output of said photodetector and that of said dither oscillator to provide a DC error signal to said tuning means of said laser to be stabilized and to said second electromechanical transducer.

References Cited

UNITED STATES PATENTS

| | | | |
|---|---|---|---|
| 3,170,122 | 2/1965 | Bennett | 331—94.5 |
| 3,252,110 | 5/1968 | Gustafson et al. | 331—94.5 |
| 3,431,514 | 3/1969 | Oshman et al. | 331—94.5 |

OTHER REFERENCES

"A Method of Producing an Unmodulated Laser Output at a Controlled Frequency," by D. C. Wilson et al., Journ. Sci. Instr., 1966, vol. 43, pp. 314–6.

RONALD L. WIBERT, Primary Examiner

P. K. GODWIN, Assistant Examiner

U.S. Cl. X.R.

332—7.5, 7.51